(12) United States Patent
Fukui et al.

(10) Patent No.: US 8,890,488 B2
(45) Date of Patent: Nov. 18, 2014

(54) POWER SUPPLY APPARATUS AND METHOD OF CONTROLLING THE SAME

(75) Inventors: Kaoru Fukui, Sakura (JP); Tohru Kuribayashi, Utsunomiya (JP); Taichi Ogawa, Utsunomiya (JP); Kazuki Takahashi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 412 days.

(21) Appl. No.: 13/441,668

(22) Filed: Apr. 6, 2012

(65) Prior Publication Data
US 2012/0256611 A1 Oct. 11, 2012

(30) Foreign Application Priority Data
Apr. 8, 2011 (JP) .................. 2011-086130

(51) Int. Cl.
*H02J 7/00* (2006.01)
*B60L 11/18* (2006.01)
*B60L 3/00* (2006.01)

(52) U.S. Cl.
CPC ............ *H02J 7/0063* (2013.01); *Y02T 10/7005* (2013.01); *Y02T 10/705* (2013.01); *H02J 2007/0067* (2013.01); *B60L 2270/20* (2013.01); *B60L 11/1851* (2013.01); *B60L 3/003* (2013.01); *B60L 3/0061* (2013.01); *B60L 3/0046* (2013.01)
USPC ........................................................ 320/163

(58) Field of Classification Search
USPC ........................... 320/106, 162–164; 323/304
See application file for complete search history.

(56) References Cited

U.S. PATENT DOCUMENTS

| | | | |
|---|---|---|---|
| 6,160,490 A | 12/2000 | Pace et al. | |
| 6,603,223 B2 * | 8/2003 | Utsunomiya | 307/154 |
| 6,744,698 B2 * | 6/2004 | Koyama et al. | 368/204 |
| 8,193,777 B2 * | 6/2012 | Nakashima | 320/141 |
| 8,653,793 B2 * | 2/2014 | Ueki et al. | 320/132 |
| 2002/0171397 A1 | 11/2002 | Adrian et al. | |
| 2005/0014602 A1 | 1/2005 | Hara et al. | |
| 2008/0143183 A1 | 6/2008 | Hoshiba | |

FOREIGN PATENT DOCUMENTS

| | | |
|---|---|---|
| CN | 101115640 | 1/2008 |
| DE | 69811721 T2 | 11/2003 |
| EP | 1844971 A1 | 10/2007 |

(Continued)

OTHER PUBLICATIONS

Chinese Office Action for Application No. 201210075929.1, 8 pages, dated Mar. 6, 2014.

(Continued)

*Primary Examiner* — Edward Tso
*Assistant Examiner* — Ramy Ramadan
(74) *Attorney, Agent, or Firm* — Nelson Mullins Riley & Scarborough LLP; Anthony A. Laurentano (57) ABSTRACT

A power supply apparatus includes a controller. If the controller detects that the internal resistance of a battery detected by an internal resistance detecting unit is relatively high, then the controller switches a first switch from an open state to a closed state using a first threshold value with respect to the voltage difference between a battery voltage and a system voltage, and if the controller detects that the internal resistance of the battery is relatively low, then the controller switches the first switch from the open state to the closed state using a second threshold value which is smaller than the first threshold value.

3 Claims, 6 Drawing Sheets

(56) References Cited

FOREIGN PATENT DOCUMENTS

| | | |
|---|---|---|
| JP | 2001-327001 | 11/2001 |
| JP | 2007-242247 | 9/2007 |
| JP | 2009-50079 | 3/2009 |

OTHER PUBLICATIONS

Japanese Office Action for Application No. 2011-086130, 3 pages, dated Mar. 19, 2013.
European Office Action for Application No. 12161213.9, 5 pages, dated Aug. 14, 2012.

* cited by examiner

POWER SUPPLY APPARATUS AND METHOD OF CONTROLLING THE SAME

CROSS-REFERENCE TO RELATED APPLICATION

This application is based upon and claims the benefit of priority from Japanese Patent Application No. 2011-086130 filed on Apr. 8, 2011, of which the contents are incorporated herein by reference.

BACKGROUND OF THE INVENTION

1. Field of the Invention

The present invention relates to a power supply apparatus which is capable of performing a precharging process for preventing a relay circuit from being damaged by an inrush current, and a method of controlling such a power supply apparatus.

2. Description of the Related Art

There is known a power supply apparatus having a high-voltage battery for use on vehicles or the like {see Japanese Laid-Open Patent Publication No. 2001-327001 (hereinafter referred to as "JP2001-327001A")}. According to JP2001-327001A, two system main relays (SMR1, SMR2) are connected in parallel to each other between battery modules (BM1, BM2) of an HV battery (194) and a drive circuit (191, 192) and a motor (MG1, MG2) (see FIG. 2 of JP2001-327001A). A limiting resistor (LR) is connected in series to one of the system main relays (SMR1).

For energizing the motors, firstly the system main relay (SMR1) is turned on to perform a precharging process. Since the limiting resistor (LR) is connected to the system main relay (SMR1), a load voltage (Vinv) increases gradually to prevent an inrush current from being generated (FIG. 3 and paragraph [0049] of JP2001-327001A). When the load voltage (Vinv) reaches about 80% of a power supply voltage (Vbat), for example, the precharging process is completed, and the other system main relay SMR2 is turned on. When the load voltage (Vinv) becomes substantially equal to the power supply voltage (Vbat), the system main relay (SMR1) is turned off, thereby bringing the HV battery (194) into an ON state (paragraph [0049] of JP2001-327001A).

SUMMARY OF THE INVENTION

According to JP2001-327001A, as described above, the precharging process is finished when the load voltage (Vinv) reaches about 80% of the power supply voltage (Vbat). However, JP2001-327001A does not refer to the specifications of a power supply voltage sensor (VB) for the power supply voltage (Vbat) and a load voltage sensor (VI) for the load voltage (Vinv). When a large inrush current occurs, the contacts of the relay to which no resistor is connected in series, i.e., the system main relay (SMR2), tend to be damaged. For reliably preventing an inrush current from occurring, it is necessary to increase the detection accuracy of both the power supply voltage sensor (VB) and the load voltage sensor (VI). However, if the detection accuracy for an entire voltage range to be detected, i.e., a voltage range used therefor, is increased, then the cost of the voltage sensors is also increased.

It is an object of the present invention to provide a power supply apparatus which is capable of reliably preventing damage by an inrush current and yet which is low in cost, and a method of controlling such a power supply apparatus.

According to the present invention, there is provided a power supply apparatus comprising a battery connected to an electric load through a power supply circuit and which supplies electric power to the electric load, the power supply circuit including a first switch whose contacts are connected between one of positive and negative terminals of the battery and the electric load, a second switch whose contacts are connected in parallel to the first switch, a resistor connected in parallel to the first switch and in series to the second switch, and a controller for selectively opening and closing the first switch and the second switch to control supply of electric power to the electric load, a power supply voltage detecting unit for detecting a power supply voltage between the battery and the power supply circuit, a system voltage detecting unit for detecting a system voltage between the power supply circuit and the electric load, and an internal resistance detecting unit for detecting an internal resistance of the battery, wherein when the first switch is in an open state, the controller switches the second switch from an open state to a closed state, and thereafter switches the first switch from the open state to a closed state depending on the voltage difference between the power supply voltage detected by the power supply voltage detecting unit and the system voltage detected by the system voltage detecting unit, and if the controller detects that the internal resistance of the battery detected by the internal resistance detecting unit is relatively high, the controller switches the first switch from the open state to the closed state using a first threshold value with respect to the voltage difference, and if the controller detects that the internal resistance of the battery detected by the internal resistance detecting unit is relatively low, the controller switches the first switch from the open state to the closed state using a second threshold value which is smaller than the first threshold value.

With the above invention, when the internal resistance of the battery is relatively high, the threshold with respect to the voltage difference between the power supply voltage and the system voltage is increased, i.e., the greater first threshold value is used, and when the internal resistance of the battery is relatively low, the threshold with respect to the voltage difference is reduced, i.e., the smaller second threshold value is used. Consequently, in a battery voltage range wherein the internal resistance of the battery is high, the detection accuracy of at least one of the power supply voltage detecting unit and the system voltage detecting unit is allowed to be reduced. As a result, regardless of the internal resistance of the battery, the specification requirements of at least one of the power supply voltage detecting unit and the system voltage detecting unit may be less strict than the case where the detection accuracy of the power supply voltage detecting unit and the system voltage detecting unit is high. The cost of at least one of the power supply voltage detecting unit and the system voltage detecting unit can thus be reduced.

In addition, when the internal resistance of the battery is high, the first threshold value is selected. Therefore, when the detection accuracy of the system voltage detecting unit is high in the battery voltage range wherein the internal resistance of the battery is high, it is possible to turn on, i.e., close, the first switch more early. The precharging control process can thus be completed quickly.

The internal resistance detecting unit may include the power supply voltage detecting unit, and if the controller detects that the power supply voltage is relatively low, the controller switches the first switch from the open state to the closed state using the first threshold value, and if the controller detects that the power supply voltage is relatively high, the controller switches the first switch from the open state to the closed state using the second threshold value.

The battery has such characteristics that the battery voltage which is relatively low corresponds to the internal resistance which is relatively high, and the battery voltage which is relatively high corresponds to the internal resistance which is relatively low. Therefore, the battery voltage detecting unit can directly be used to detect the internal resistance. The power supply apparatus can thus be reduced in cost. Alternatively, if the power supply apparatus includes both the battery voltage detecting unit and a state-of-charge (SOC) detecting unit, not shown, for detecting the SOC of the battery, then the power supply apparatus has an excellent fail-safe capability.

According to the present invention, there is also provided a method of controlling a power supply apparatus including a battery connected to an electric load through a power supply circuit and which supplies electric power to the electric load, the power supply circuit including a first switch whose contacts are connected between one of positive and negative terminals of the battery and the electric load, a second switch whose contacts are connected in parallel to the first switch, a resistor connected in parallel to the first switch and in series to the second switch, and a controller for selectively opening and closing the first switch and the second switch to control supply of electric power to the electric load, the method comprising the first switching step of keeping the first switch in an open state and switching the second switch from an open state to a closed state, the second switching step of keeping the second switch in the closed state and switching the first switch from the opening state to a closed state, and the third switching step of keeping the first switch in the closed state and switching the second switch from the closed state to the open state, wherein the second switching step comprising the steps of detecting an output voltage of the battery, an input voltage of the electric load, and an internal resistance of the battery; and if the internal resistance of the battery is detected as being relatively high, switching the first switch from the open state to the closed state when the voltage difference between the output voltage of the battery and the input voltage of the electric load exceeds a first predetermine value, and if the internal resistance of the battery is detected as being relatively low, switching the first switch from the open state to the closed state when the voltage difference exceeds a second predetermined value which is smaller than the first predetermine value.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

1. Embodiment:
[1-1. Configuration of Electric Vehicle 10]

Figure 1:
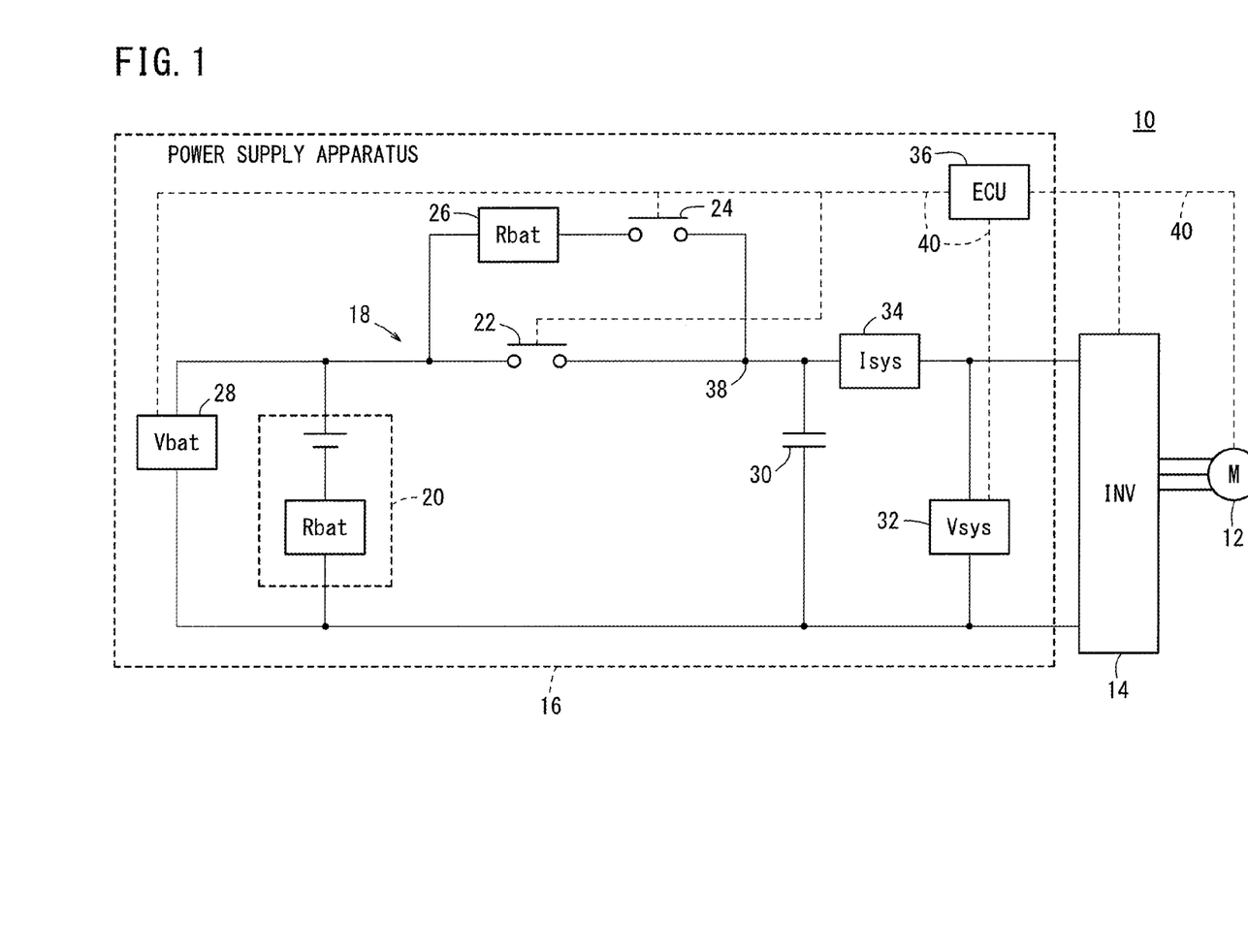
FIG. 1 is a block diagram of an electric vehicle incorporating a power supply apparatus according to an embodiment of the present invention.

FIG. 1 is a block diagram of an electric vehicle 10 (hereinafter also referred to as "a vehicle 10") incorporating a power supply apparatus 16 according to an embodiment of the present invention. The vehicle 10 includes, in addition to the power supply apparatus 16, a traction motor 12 (electric load), and an inverter 14 (electric load).

The motor 12 comprises a three-phase AC brushless motor which generates a drive force F [N] (or a torque [N·m]) for the vehicle 10 based on the electric power supplied from a high-voltage battery 20 (hereinafter referred to as "a battery 20") through a power supply circuit 18 and the inverter 14. The motor 12 also regenerates electric power (regenerated electric power Preg) [W] in a regenerative mode, and supplies the regenerated electric power to the battery 20 and auxiliaries, not shown, thereby charging the battery 20 and energizing the auxiliaries.

The inverter 14 comprises a three-phase bridge inverter which converts a direct current from the battery 20 into three-phase alternating currents and supplies the three-phase alternating currents to the motor 12. The inverter 14 also supplies a direct current, which has been converted from three-phase alternating currents generated by the motor 12 in the regenerative mode, to the high-voltage battery 20 and the auxiliaries.

The power supply apparatus 16 includes the power supply circuit 18 and the battery 20. The power supply circuit 18 has a high-voltage relay 22 (first switch), a precharging relay 24 (second switch), a precharging resistor 26, a battery voltage sensor 28 (power supply voltage sensor, power supply voltage detecting unit), a capacitor 30 (electric load), a system voltage sensor (system voltage detecting unit) 32, a system current sensor 34, and an electronic control unit (controller) 36 (hereinafter referred to as "an ECU 36").

The high-voltage battery 20 comprises an energy storage device including a plurality of battery cells, and may be a lithium ion secondary battery, a nickel hydrogen battery, a capacitor, or the like. According to the present embodiment, the high-voltage battery 20 is a lithium ion secondary battery. A DC-to-DC converter (not shown) may be connected between the inverter 14 and the battery 20 for stepping up or stepping down the output voltage of the battery 20 or the output voltage of the motor 12.

The high-voltage relay 22 is a normally open type on-off switch used when the vehicle 10 operates normally in a power mode or a regenerative mode. The high-voltage relay 22 is connected between the positive terminal of the battery 20 and the inverter 14.

The precharging relay 24 is a normally open type on-off switch used to carry out a precharging control process (to be described later). The precharging relay 24 is connected between the positive terminal of the battery 20 and the inverter 14 in parallel to the high-voltage relay 22 and in series to the precharging resistor 26. The precharging resistor 26 serves to gradually increase an input/output voltage across the motor 12, i.e., a system voltage Vsys to be described later, at the time the precharging relay 24 is turned on, i.e., closed.

The battery voltage sensor 28 detects an input/output voltage of the battery 20 (hereinafter referred to as "a battery voltage Vbat" or "a power supply voltage"), and outputs the detected battery voltage Vbat to the ECU 36. The capacitor 30 has one end connected between a junction 38 between the positive terminals of the precharging relay 24 and the high-voltage relay 22 and the inverter 14, and the other end connected between the inverter 14 and the negative terminal of the battery 20.

The system voltage sensor 32 serves to detect an input/output voltage (hereinafter referred to as "a system voltage Vsys" or "a load voltage") across an electric load (hereinafter referred to as "a load") including the motor 12 and the inverter 14. The system voltage sensor 32 is connected in parallel to the capacitor 30 on the motor side of the capacitor 30. The system current sensor 34 serves to detect a current (hereinafter referred to as "a system current Isys" or "a load current") flowing into or out of the load including the motor 12 and the inverter 14. The system current sensor 34 is connected between the one end of the capacitor 30 and the inverter 14.

The ECU 36 controls various components of the vehicle 10 through communication lines 40, and includes input and output units, a processor, and a memory, not shown. According to the present embodiment, the ECU 36 carries out the precharging control process to prevent damage caused by an inrush current.

[1-2. Characteristics of High-voltage Battery 20]

Figure 2:
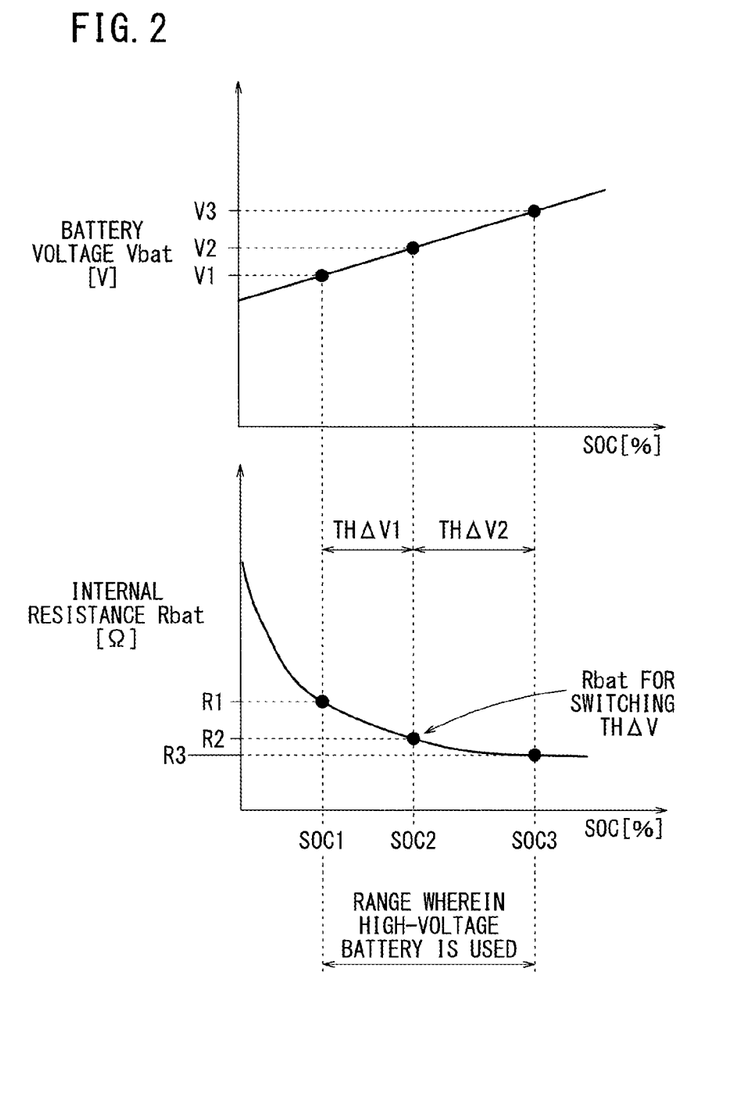
FIG. 2 is a diagram showing an example of the relationship between the output voltage, the state of charge (SOC), and the internal resistance of a high-voltage battery.

FIG. 2 shows an example of a relationship between the output voltage (battery voltage Vbat), the state of charge (SOC), and the internal resistance Rbat [Ω] of the high-voltage battery 20. As shown in FIG. 2, when the battery voltage Vbat is of a high value, e.g., voltage V3, the SOC is also of a high value, e.g. SOC3, but the internal resistance Rbat is of a low value, e.g., resistance value R3. When the battery voltage Vbat is of a low value, e.g., voltage V1, the SOC is also of a low value, e.g. SOC1, but the internal resistance Rbat is of a high value, e.g., resistance value R1. According to the present embodiment, the high-voltage battery 20 is used in a range from voltage V1 to voltage V3 (from SOC1 to SOC3).

[1-3. Detection Accuracy of System Voltage Sensor 32]

Figure 3:
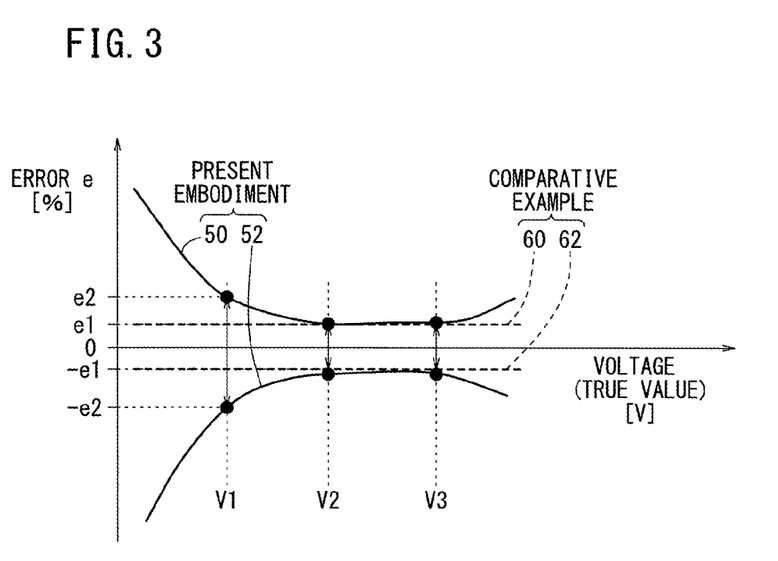
FIG. 3 is a diagram showing the levels of detection accuracy of a system voltage sensor according to the embodiment and a system voltage sensor according to a comparative example.

FIG. 3 shows the levels of detection accuracy of the system voltage sensor 32 according to the present embodiment and a system voltage sensor according to a comparative example. In FIG. 3, the horizontal axis represents true values of the system voltage Vsys, i.e., the true values of the voltage at the system voltage sensor 32, and the vertical axis represents the errors e [%] of the system voltage sensor 32 according to the present embodiment and the system voltage sensor according to the comparative example.

As shown in FIG. 3, an area between curves 50, 52 represents an area in which the detected values (of the system voltage Vsys) of the system voltage sensor 32 according to the present embodiment can exist with respect to the true values of the system voltage Vsys, and an area between straight lines 60, 62 represents an area in which the detected values of the system voltage sensor according to the comparative example.

As can be seen from FIG. 3, the detected values of the system voltage sensor according to the comparative example are set (designed) to fall within a range from error e1 to error −e1 in the range from voltage V1 to voltage V3 in which the battery 20 is used. Therefore, the system voltage sensor according to the comparative example has a relatively high and constant level of detection accuracy.

The detected values (of the system voltage Vsys) of the system voltage sensor 32 according to the present embodiment are also set to fall within the range from error e1 to error −e1 from voltage V2 to voltage V3 in the range in which the battery 20 is used, as with the comparative example. Therefore, the system voltage sensor 32 according to the present embodiment has a relatively high and constant level of detection accuracy in the range from voltage V2 to voltage V3. From voltage V1 to voltage V2, however, the error e is greater. When the true value of the detected voltage is voltage V1, for example, the error e falls within a range from error e2 to error −e2. Consequently, the system voltage sensor 32 according to the present embodiment has a relatively low level of detection accuracy in the range from voltage V1 to voltage V2.

According to the present embodiment, the detection accuracy is lower in the range from voltage V1 to voltage V2 than that according to the comparative example. However, the lower level of detection accuracy can be compensated for by the precharging control process to be described below.

2. Precharging Control Process:

[2-1. Purpose of Precharging Control Process]

According to the present embodiment, when the vehicle 10 is in the power mode, the battery 20 supplies electric power to the motor 12, and when the vehicle 10 is in the regenerative mode, the motor 12 supplies the regenerated electric power Preg to the battery 20 to charge the battery 20. When the battery 20 and the motor 12 are connected to each other, the high-voltage relay 22 is turned on, i.e., closed. When the motor 12 and the inverter 14 are not energized, i.e., when the duty ratios of a plurality of switching elements, not shown, of the inverter 14 are zero, electric power is accumulated in only the capacitor 30.

If the system current Isys (hereinafter referred to as "inrush current Ii") that flows between the battery 20 and the capacitor 30 when the high-voltage relay 22 is turned on, i.e., closed, is excessively large beyond a limit inrush current Ii_lim, then the contacts of the high-voltage relay 22, for example, may possibly be damaged. The inrush current Ii is determined by the following equation (1):

$$Ii = \Delta V \div R\text{bat} \tag{1}$$

where $\Delta V$ represents the voltage difference between the battery voltage Vbat and the system voltage Vsys ($\Delta V$=Vbat−Vsys), and Rbat represents the internal resistance of the battery 20. All the values involved in the equation (1) mean true values.

As can be seen from the equation (1), if the voltage difference $\Delta V$ is reduced, then the inrush current Ii is reduced. According to the present embodiment, the precharging relay 24, which is connected in series to the precharging resistor 26, is initially turned on, i.e., closed, to gradually increase the system voltage Vsys, thereby reducing the voltage difference $\Delta V$, after which the high-voltage relay 22 is turned on, i.e., closed. In this manner, the inrush current Ii is reduced.

The equation (1) also indicates that if the internal resistance Rbat is high, then the inrush current Ii is low. According to the present embodiment, when the internal resistance Rbat is high, the detection accuracy of the system voltage sensor 32 is permitted to be low. Accordingly, a decision criterion (i.e., threshold value TH$\Delta V$ to be described later) for turning on, i.e., closing, the high-voltage relay 22 is changed depending on the internal resistance Rbat.

[2-2. Details of Precharging Control Process]

(2-2-1. Operational Sequence of Precharging Control Process)

Figure 4:
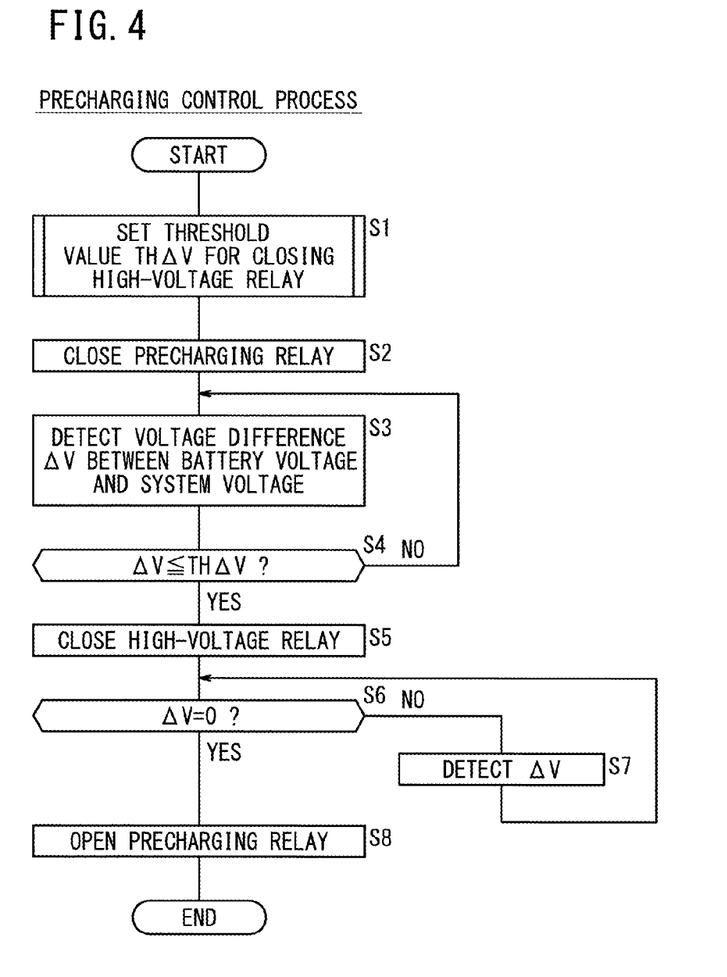
FIG. 4 is a flowchart of a precharging control sequence according to the embodiment.
Figure 5:
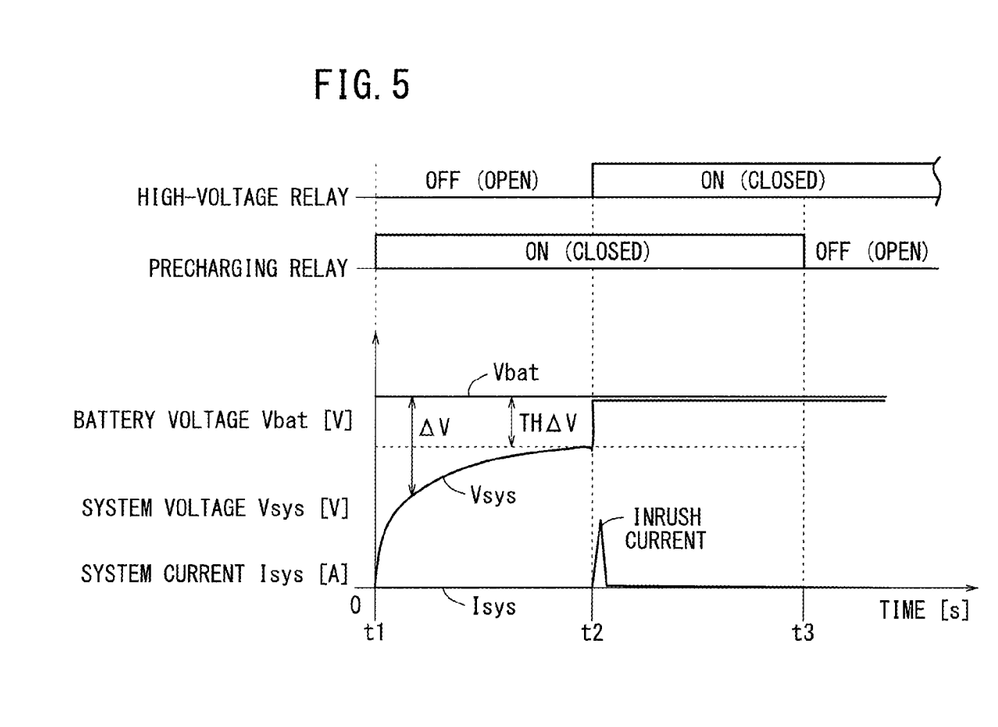
FIG. 5 is a timing chart showing an example of the relationship between the ON (closed) and OFF (open) states of a high-voltage relay and a precharging relay, the battery voltage, the system voltage, and the system current at the time the precharging control process according to the embodiment is performed.

FIG. 4 is a flowchart of the precharging control sequence according to the present embodiment. FIG. 5 is a timing chart showing an example of the relationship between the ON (closed) and OFF (open) states of the high-voltage relay 22 and the precharging relay 24, the battery voltage Vbat, the system voltage Vsys, and the system current Isys at the time the precharging control process according to the present embodiment is performed. At the start of the precharging control sequence shown in FIG. 4, the precharging relay 24 and the high-voltage relay 22 are turned off, i.e., open. In FIG. 5, the motor 12 and the inverter 14 are not energized, and electric power is accumulated in only the capacitor 30.

In step S1 shown in FIG. 4, the ECU 36 sets a threshold value THΔV for turning on, i.e., closing, the high-voltage relay 22, as described in detail later. In step S2, the ECU 36 turns on, i.e., closes, the precharging relay 24 at time t1 in FIG. 5. The system voltage Vsys now start to increase gradually.

In step S3, the ECU 36 detects the voltage difference ΔV between the battery voltage Vbat from the battery voltage sensor 28 and the system voltage Vsys from the system voltage sensor 32. In step S4, the ECU 36 judges whether or not the voltage difference ΔV is equal to or smaller than the threshold value THΔV set in step S1. If the voltage difference ΔV is not equal to or smaller than the threshold value THΔV (S4: NO), then control goes back to step S3. If the voltage difference ΔV is equal to or smaller than the threshold value THΔV (S4: YES), then control goes to step S5.

In step S5, the ECU 36 turns on, i.e., closes, the high-voltage relay 22 at time t2. The system voltage Vsys now quickly approaches the battery voltage Vbat. In step S6, the ECU 36 judges whether the system voltage Vsys is equal to the battery voltage Vbat or not, i.e., whether the voltage difference ΔV is zero or not. At this time, the ECU 36 may judge whether the voltage difference ΔV is equal to or smaller than a threshold value that is nearly zero. If the voltage difference ΔV is not zero (S6: NO), then the ECU 36 detects the voltage difference ΔV in step S7 as in step S3, and control goes back to step S6.

If the voltage difference ΔV is zero (S6: YES), then the ECU 36 turns off, i.e., opens, the precharging relay 24 after elapse of a given time, i.e., at time t3, in step S8.

In FIG. 5, since electric power is accumulated in only the capacitor 30, the system current Isys is zero except when an inrush current Ii occurs instantaneously.

(2-2-2. Setting of Threshold Value THΔV)

Figure 6:
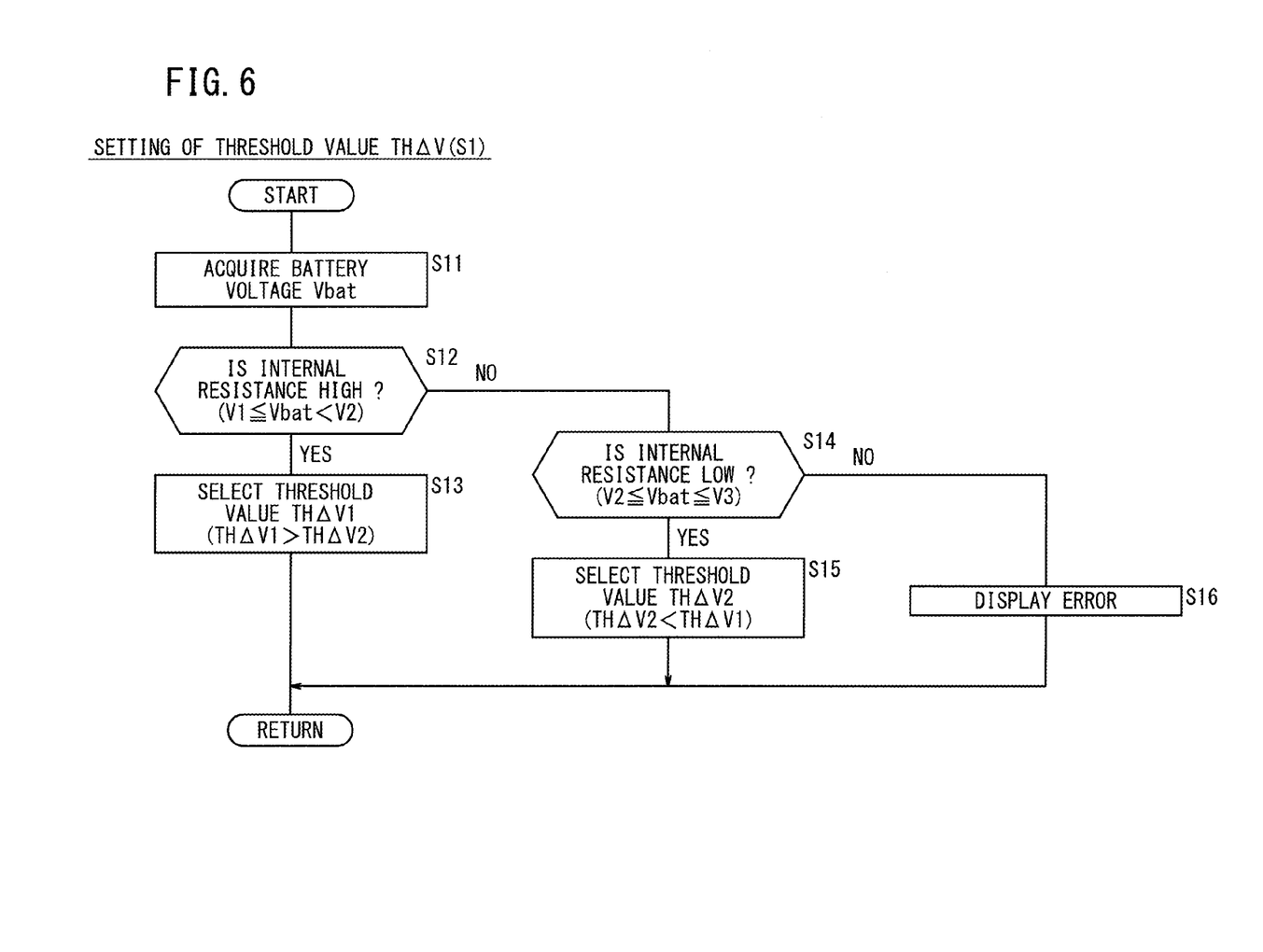
FIG. 6 is a flowchart of a sequence for setting a threshold value for turning on (closing) the high-voltage relay in the precharging control process.

FIG. 6 is a flowchart of a sequence (details of step S1 in FIG. 4) for setting the threshold value THΔV for turning on (closing) the high-voltage relay 22 in the precharging control process.

In step S11 shown in FIG. 6, the ECU 36 acquires the battery voltage Vbat from the battery voltage sensor 28. Next, in step S12, the ECU 36 judges whether the internal resistance Rbat of the battery 20 is high or not. As described above with reference to FIG. 2, the battery voltage Vbat is low when the internal resistance Rbat is high. According to the present embodiment, the ECU 36 judges whether the internal resistance Rbat is high or not by judging whether or not the battery voltage Vbat falls within a predetermined range which is equal to or greater than V1 and lower than V2.

If the battery voltage Vbat falls within the predetermined range which is equal to or greater than V1 and lower than V2 and hence the internal resistance Rbat is high (S12: YES), then the ECU 36 selects a threshold value THΔV1 for the high internal resistance in step S13. The threshold value THΔV1 is greater than a threshold value THΔV2 for a low internal resistance to be described later (THΔV1>THΔV2).

In step S12, if the battery voltage Vbat does not fall within the predetermined range which is equal to or greater than V1 and lower than V2 and hence the internal resistance Rbat is not high (S12: NO), then control goes to step S14.

In step S14, the ECU 36 judges whether the internal resistance Rbat of the battery 20 is low or not. As described above with reference to FIG. 2, the battery voltage Vbat is high when the internal resistance Rbat is low. According to the present embodiment, the ECU 36 judges whether the internal resistance Rbat is low or not by judging whether or not the battery voltage Vbat falls within a predetermined range which is equal to or greater than V2 and equal to or lower than V3.

If the battery voltage Vbat falls within the predetermined range which is equal to or greater than V2 and equal to or lower than V3 and hence the internal resistance Rbat is low (S14: YES), then the ECU 36 selects a threshold value THΔV2 for the low internal resistance in step S15. The threshold value THΔV2 is smaller than the above-mentioned threshold value THΔV1 for the high internal resistance (THΔV2<THΔV1).

If the battery voltage Vbat does not fall within the predetermined range which is equal to or greater than V2 and equal to or lower than V3 and hence the internal resistance Rbat is not low (S14: NO), then the battery voltage Vbat can be regarded as not being within the range from voltage V1 to voltage V3 in which the battery 20 is used. Then, in step S16, the ECU 36 displays an error, and finishes the present cycle of the sequence shown in FIG. 6.

3. Advantages of the Present Embodiment:

According to the present embodiment, as described above, when the internal resistance Rbat of the battery 20 is relatively high, i.e., when the battery voltage Vbat is equal to or higher than V1 and lower than V2, the threshold value THΔV1 is selected (step S13 shown in FIG. 6), and when the internal resistance Rbat of the battery 20 is relatively low, i.e., when the battery voltage Vbat is equal to or higher than V2 and equal to or lower than V3, the threshold value THΔV2 is selected (step S15 shown in FIG. 6). Therefore, the detection accuracy of the system voltage sensor 32 is allowed to be lowered in the battery voltage range which is equal to or higher than V1 and lower than V2, i.e., in the range wherein the internal resistance Rbat of the battery 20 is high.

Specifically, when the internal resistance Rbat is high, the system current Isys that flows at the time the high-voltage relay 22 is turned on increases more gradually than when the internal resistance Rbat is low. The high internal resistance Rbat corresponds to the low battery voltage Vbat (see FIG. 2). Therefore, when the battery voltage Vbat is low, the possibility that the contacts of the high-voltage relay 22 will be damaged is low even if the detection accuracy of the system voltage sensor 32 is relatively low, i.e., if the detected value from the system voltage sensor 32 is lower than the true value, and the voltage difference ΔV is increased. According to the present embodiment, consequently, the detection accuracy of the system voltage sensor 32 is allowed to be lowered in the battery voltage range which is equal to or higher than V1 and lower than V2, i.e., in the range wherein the internal resistance Rbat of the battery 20 is high (see FIG. 3).

As a result, regardless of the internal resistance Rbat of the battery 20, the specification requirements of the system voltage sensor 32 are less strict than in the case wherein the detection accuracy of the system voltage sensor 32 is high in the overall range in which the battery 20 is used (see the comparative example shown in FIG. 3). The cost of the system voltage sensor 32 can thus be reduced.

In addition, when the internal resistance Rbat of the battery 20 is high, the threshold value THΔV1 (>THΔV2) is selected. Therefore, when the detection accuracy of the system voltage sensor 32 is high in the battery voltage range which is equal to or higher than V1 and lower than V2 wherein the internal resistance Rbat of the battery 20 is high, it is possible to turn on, i.e., close, the high-voltage relay 22 more early. The precharging control process can thus be completed quickly.

According to the present embodiment, if the ECU 36 detects that the battery voltage Vbat is relatively low, i.e., equal to or higher than V1 and lower than V2, then the ECU 36 switches the high-voltage relay 22 from the open state to the closed state using the relatively large threshold value THΔV1 (>THΔV2). If the ECU 36 detects that the battery voltage Vbat is relatively high, i.e., equal to or higher than V2 and equal to or lower than V3, then the ECU 36 switches the high-voltage relay 22 from the open state to the closed state using the relatively small threshold value THΔV2 (<THΔV1).

The battery 20 has such characteristics that the battery voltage Vbat which is relatively low corresponds to the internal resistance Rbat which is relatively high, and the battery voltage Vbat which is relatively high corresponds to the internal resistance Rbat which is relatively low. Therefore, the battery voltage sensor 28 can directly be used to detect the internal resistance Rbat. The power supply apparatus 16 can thus be further reduced in cost. If the power supply apparatus 16 includes both the battery voltage sensor 28 and a SOC sensor, not shown, for detecting the SOC of the battery 20, in order to detect the internal resistance Rbat, then the power supply apparatus 16 has an excellent fail-safe capability.

4. Modifications:

The principles of the present invention are not limited to the above embodiment, but various changes and modifications may be made to the embodiment. Some of such changes and modifications will be described below.

[4-1. Objects Incorporating Power Supply Apparatus 16]

In the above embodiment, the power supply apparatus 16 is incorporated in the vehicle 10. However, the power supply apparatus 16 may be incorporated in any objects which need the precharging control process. For example, the power supply apparatus 16 may be incorporated in mobile objects including electric trains, ships, airplanes, etc. The power supply apparatus 16 may also be incorporated in stationary objects such as machine tools.

[4-2. High-voltage Battery 20]

In the above embodiment, a lithium ion battery is used as the high-voltage battery 20. However, any power supplies whose internal resistance varies depending on the state of use thereof may be used as the high-voltage battery 20. For example, the high-voltage battery 20 may be a nickel hydrogen battery or an energy storage device such as a capacitor or the like.

[4-3. High-voltage Relay 22 and Precharging Relay 24]

In the above embodiment, the high-voltage relay 22 and the precharging relay 24 are connected to the positive terminal of the battery 20. However, the high-voltage relay 22 and the precharging relay 24 may be connected to the negative terminal of the battery 20.

[4-4. Threshold Value THΔV]

In the above embodiment, the battery voltage Vbat is used as a numerical value for setting the threshold value THΔV for turning on, i.e., closing, the high-voltage relay 22. However, such a numerical value is not limited to the battery voltage Vbat. For example, the ECU 36 may judge whether the internal resistance Rbat is high or low based on the SOC of the battery 20 which is detected by a SOC sensor, not shown (see FIG. 2).

In the above embodiment, the threshold value THΔV is divided into two threshold values, i.e., the threshold value THΔV1 and the threshold value THΔV2. However, the threshold value THΔV may be divided into three threshold values. In such a case, a map representative of a relationship between the battery voltage Vbat or SOC and the threshold value THΔV, for example, may be employed.

[4-5. Detection Accuracy of Voltage Sensor]

In the above embodiment, the detection accuracy of the system voltage sensor 32 is lowered in the battery voltage range wherein the internal resistance Rbat of the battery 20 is high. However, the detection accuracy of the battery voltage sensor 28 may be lowered in the battery voltage range. Alternatively, the detection accuracy of both the battery voltage sensor 28 and the system voltage sensor 32 may be lowered in the battery voltage range. Further alternatively, the detection accuracy of both the battery voltage sensor 28 and the system voltage sensor 32 may remain high for the purpose of shortening the period of the precharging control process.

Although a certain preferred embodiment of the present invention has been shown and described in detail, it should be understood that various changes and modifications may be made therein without departing from the scope of the appended claims.

What is claimed is:

1. A power supply apparatus comprising:
a battery connected to an electric load through a power supply circuit and which supplies electric power to the electric load;
the power supply circuit including a first switch whose contacts are connected between one of positive and negative terminals of the battery and the electric load, a second switch whose contacts are connected in parallel to the first switch, a resistor connected in parallel to the first switch and in series to the second switch, and a controller for selectively opening and closing the first switch and the second switch to control supply of electric power to the electric load;
a power supply voltage detecting unit for detecting a power supply voltage between the battery and the power supply circuit;
a system voltage detecting unit for detecting a system voltage between the power supply circuit and the electric load; and
an internal resistance detecting unit for detecting an internal resistance of the battery;
wherein when the first switch is in an open state, the controller switches the second switch from an open state to a closed state, and thereafter switches the first switch from the open state to a closed state depending on a voltage difference between the power supply voltage detected by the power supply voltage detecting unit and the system voltage detected by the system voltage detecting unit; and
if the controller detects that the internal resistance of the battery detected by the internal resistance detecting unit is relatively high, the controller switches the first switch from the open state to the closed state using a first threshold value with respect to the voltage difference, and if the controller detects that the internal resistance of the battery detected by the internal resistance detecting unit is relatively low, the controller switches the first switch from the open state to the closed state using a second threshold value which is smaller than the first threshold value.

2. The power supply apparatus according to claim 1, wherein the internal resistance detecting unit includes the power supply voltage detecting unit; and
if the controller detects that the power supply voltage is relatively low, the controller switches the first switch from the open state to the closed state using the first threshold value, and if the controller detects that the power supply voltage is relatively high, the controller switches the first switch from the open state to the closed state using the second threshold value.

3. A method of controlling a power supply apparatus including a battery connected to an electric load through a power supply circuit and which supplies electric power to the electric load, the power supply circuit including a first switch whose contacts are connected between one of positive and negative terminals of the battery and the electric load, a second switch whose contacts are connected in parallel to the first switch, a resistor connected in parallel to the first switch and in series to the second switch, and a controller for selectively opening and closing the first switch and the second switch to control supply of electric power to the electric load, the method comprising:

the first switching step of keeping the first switch in an open state and switching the second switch from an open state to a closed state;

the second switching step of keeping the second switch in the closed state and switching the first switch from the opening state to a closed state; and the third switching step of keeping the first switch in the closed state and switching the second switch from the closed state to the open state;

wherein the second switching step comprising the steps of:

detecting an output voltage of the battery, an input voltage of the electric load, and an internal resistance of the battery; and if the internal resistance of the battery is detected as being relatively high, switching the first switch from the open state to the closed state when a voltage difference between the output voltage of the battery and the input voltage of the electric load exceeds a first predetermine value, and if the internal resistance of the battery is detected as being relatively low, switching the first switch from the open state to the closed state when the voltage difference exceeds a second predetermined value which is smaller than the first predetermine value.

* * * * *